United States Patent [19]
Ochs et al.

[11] Patent Number: 5,460,260
[45] Date of Patent: Oct. 24, 1995

[54] HELICAL CONVEYOR

[75] Inventors: Gregory L. Ochs, Kirkland; James E. Aikins, Renton; Terry D. Barber, Issaquah, all of Wash.

[73] Assignee: York International Corporation, York, Pa.

[21] Appl. No.: 264,058

[22] Filed: Jun. 22, 1994

[51] Int. Cl.⁶ ..................................................... B65G 21/18
[52] U.S. Cl. ............................................................. 198/778
[58] Field of Search ................................. 198/778, 831, 198/848, 851, 841; 62/381

[56] References Cited

U.S. PATENT DOCUMENTS

| | | |
|---|---|---|
| 2,093,270 | 9/1937 | Glinka . |
| 3,938,651 | 2/1976 | Alfred et al. ............................. 198/136 |
| 4,450,953 | 5/1984 | Le Cann et al. ......................... 198/778 |
| 4,565,282 | 1/1986 | Olsson et al. ............................ 198/778 |
| 4,603,776 | 8/1986 | Olsson ..................................... 198/778 |
| 4,741,430 | 5/1988 | Roinestad ................................. 198/778 |
| 4,850,475 | 7/1989 | Lupo et al. ............................... 198/778 |
| 4,858,750 | 8/1989 | Cawley ..................................... 198/778 |
| 4,867,301 | 9/1989 | Roinestad et al. ....................... 198/852 |
| 4,875,343 | 10/1989 | Jeppsson ............................ 198/778 X |
| 4,899,871 | 2/1990 | Olsson ..................................... 198/778 |
| 4,932,925 | 6/1990 | Roinestad et al. .................. 198/778 X |
| 4,941,566 | 7/1990 | Irwin ........................................ 198/778 |
| 4,941,567 | 7/1990 | Olsson ..................................... 198/778 |
| 4,955,465 | 9/1990 | Straight et al. .......................... 198/778 |
| 4,981,208 | 1/1991 | Jones ........................................ 198/778 |
| 4,982,833 | 1/1991 | Straight et al. .......................... 198/778 |
| 5,031,751 | 7/1991 | Pahlsson ................................... 198/570 |
| 5,069,330 | 12/1991 | Palmaer et al. .......................... 198/778 |
| 5,105,934 | 4/1992 | Cawley ..................................... 198/778 |
| 5,137,141 | 8/1992 | Irwin ........................................ 198/778 |
| 5,214,934 | 6/1993 | Palframan et al. ....................... 62/381 |
| 5,350,056 | 9/1994 | Hager ....................................... 198/778 |

FOREIGN PATENT DOCUMENTS

| | | | |
|---|---|---|---|
| 2684650 | 6/1993 | France | ................................ 198/778 |
| 698360 | 11/1940 | Germany . | |
| 2410392 | 9/1974 | Germany | ............................... 198/778 |

*Primary Examiner*—James R. Bidwell
*Attorney, Agent, or Firm*—Finnegan, Henderson, Farabow, Garrett & Dunner

[57] ABSTRACT

A self stacking helical conveyor including a drum supported for rotation on a vertical axis, an endless belt trained about the drum in vertically successive helical tiers, beginning with a bottom tier, and having a width spanning a central load bearing portion and opposite side edge portions. The belt includes a plurality of successive conveyor sections interconnected for pivotal and translational movement relative to each other. Each of the conveyor sections includes a pair of spaced upstanding supports secured at the opposite side edge portions of the belt, each of the supports having a top detent formation. A bottom detent formation is provided under each of said upstanding supports. A supporting assembly is associated with the drum to support the bottom tier and the others of the helical tiers are supported by engagement of the bottom detent formations with the top detent formations on the spaced upstanding supports in an adjacent underlying tier of the belt.

22 Claims, 6 Drawing Sheets

HELICAL CONVEYOR

BACKGROUND OF THE INVENTION

The present invention relates to helical conveyors, and more particularly, to self-stacking helical conveyors for use in continuous processing of materials, such as freezing or cooking food products, for example.

Endless conveyors for continuous processing of materials loaded and unloaded continuously to and from an endless conveyor belt must have a working length adequate to permit a required duration of time in a processing environment and, at the same time, be movable at sufficiently high conveying speeds for acceptable rates of processing production. To meet these requirements, and also to reduce the space requirements of the processing environment, helical conveyors have been developed in which a working belt length, representing a substantial portion of the overall conveyor belt length, is carried through a continuous succession of vertically oriented helical flights or tiers. In this manner, a long working length of the conveyor belt may be contained in a reasonably dimensioned processing enclosure, such as a freezer, while loading and unloading lengths of the conveyor belt may be located outside of the enclosure.

The prior art relating to helical conveyors is exemplified by several U.S. Pat. Nos. including No. 2,093,270—Glinka, No. 4,450,953—Le Cann et al., No. 4,982,833—Straight et al., and No. 5,105,934—Cawley.

Glinka represents an early development in helical conveyors from the standpoint of recognizing the advantages of helical conveyors for processing (i.e., drying or otherwise treating) materials by taking advantage of the reduced space requirements of such conveyors. Le Cann et al. may be characterized as an early attempt at a solution to the mechanical problems associated with driving an endless flexible belt through a helical path. Also, Le Cann et al. represents a self-stacking approach to helical conveyors by using upstanding plate-like supports on opposite side edges of the conveyor belt to support successive tiers or "spires" of the endless belt one on the other.

Straight et al. and Cawley are representative of more recent developments in that these latter prior art references address mechanical details associated with elevating a lower-most first flight or tier in an endless belt from a horizontal run to an inclined helical turn or tier on which successive vertical tiers are supported at least on the inboard edge of a helical conveyor. The earlier Straight et al. patent cites prior U.S. patents which advantageously disclose helical belt systems in which both inner and outer edges of the endless belt are self supporting. The text of the Straight et al. patent points out that while prior attempts at self-support for both edges of an endless helical belt were advantageous from the standpoint of minimizing space occupied by the working length of a helical belt, such belts suffered a disadvantage in that the belt tier supports presented an obstruction to circulation of a processing atmosphere, i.e., cooling air, about products supported on the belt. Cawley likewise discloses an endless helical belt for processing products in which only the inboard edge of the belt is self-supporting and the outboard edge is supported by a helical ramp extending throughout the length of the helical belt length.

Both the Straight et al. and Cawley patents disclose helical conveyor systems in which support for the bottom tier of a vertically oriented helical belt is supported by trolleys which travel on a circular track aligned under the inboard edge of the belt. Also, the disclosures of both patents employ a transitional track section to support the belt over a depressed ramp portion of the circular track at which the trolleys release and engage successive bottom tiers exiting or entering the helical belt stack.

Although the prior art relating to helical conveyors, therefore, has been developed to some degree, there has been and is need for improvement.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the self stacking helical conveyor of the invention comprises a drum supported for rotation on a vertical axis, an endless belt trained about the drum in vertically successive helical tiers, beginning with a bottom tier, and having a width spanning a central load bearing portion and opposite side edge portions. The belt includes a plurality of successive conveyor sections interconnected for pivotal and translational movement relative to each other. Each of the conveyor sections includes a pair of spaced upstanding supports secured at the opposite side edge portions of the belt, each of the supports having a top detent formation. A bottom detent formation is provided under each of said upstanding supports. A supporting assembly is associated with the drum to support the bottom tier as a helical wrap or convolution. The others of the helical tiers are supported by an adjacent underlying tier of the belt without slippage between tiers due to engagement of the bottom detent formations with the top detent formations on the spaced upstanding supports.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and together with the description, serve to explain the principles of the invention. In the drawings.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

In accordance with the present invention, a self stacking helical conveyor is provided in which an endless conveyor belt is trained continuously through contiguous flight portions, the major one of such flight portions being a succession of stacked helical tiers trained about a drum supported rotatably on a vertical axis. The bottom tier of the helical stack is lifted by the pitch of each tier during one complete revolution of the drum and is transferred to be supported on the bottom tier lifted by each successive revolution of the drum.

Figure 1:
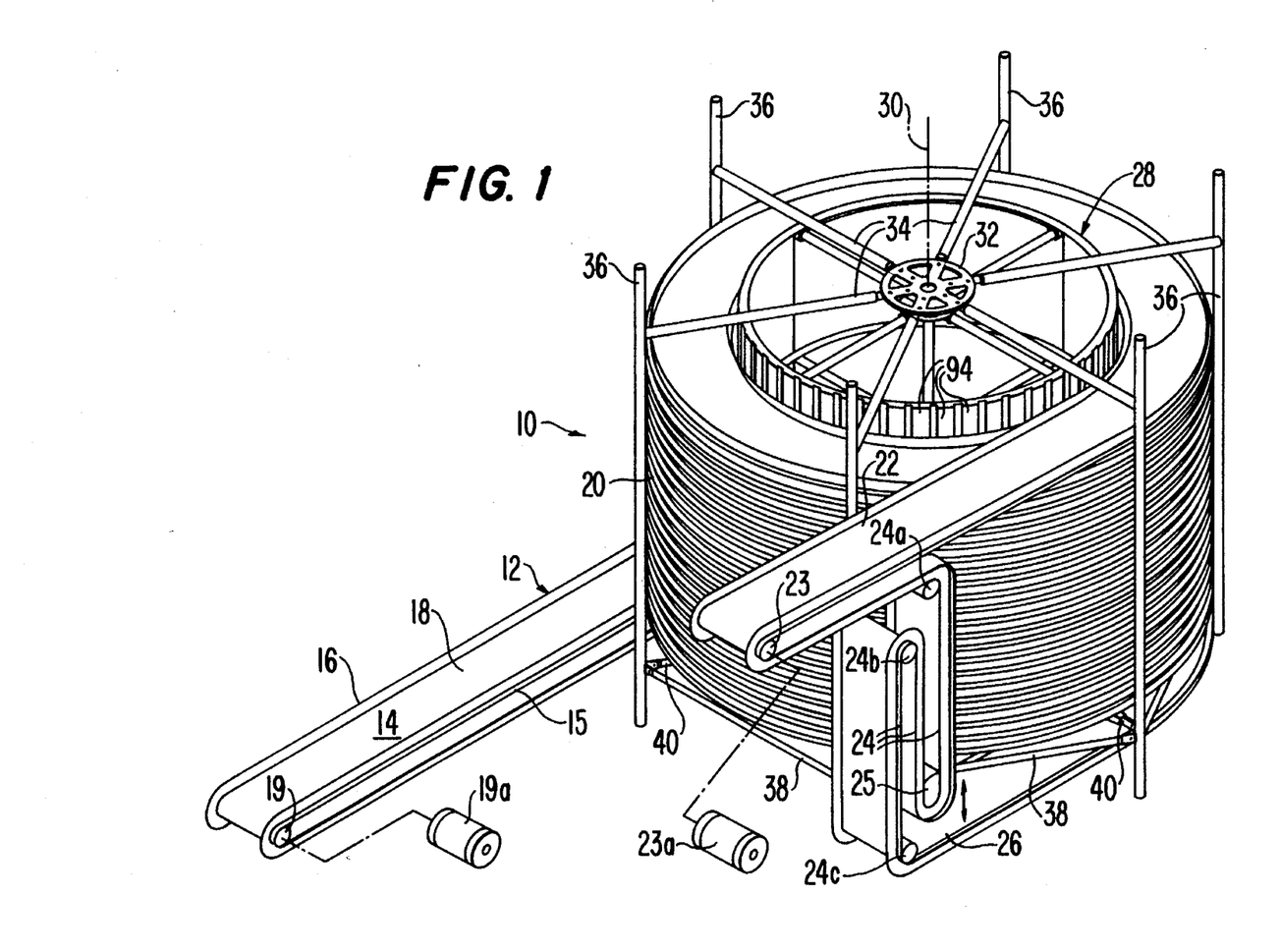
FIG. 1 is a largely schematic perspective view illustrating the overall geometry of a helical conveyor embodiment in accordance with the invention.

In the illustrated embodiment and as shown in FIG. 1, a self stacking helical conveyor is generally designated by the reference numeral 10 and includes an endless conveyor belt similarly designated by the reference numeral 12. As illustrated, the belt 12 is a continuous endless belt having a width spanning a central load carrying portion 14 and opposite edge portions 15 and 16. Lengthwise, the belt 12 is trained through contiguous flight portions including a linear loading or entrance flight portion 18 originating at a roller 19 driven by a motor 19a, a helical flight portion 20 to be described in detail below, and a linear unloading or exit flight portion 22 ending at a roller 23 driven by a motor 23a. From the roller 23, the belt passes through a series of belt tensioning flights 24 trained about three fixed-axis idler rollers 24a, 24b, 24c and a vertically movable, weighted tensioning roller 25. At the idler roller 24c, the belt joins with a return flight 26 which ends at the entrance flight portion 18. The major helical flight portion 20 is trained about a drum 28 supported at its upper end for rotation on a vertical axis 30 by a fixed bearing 32, connected in turn, to a supporting framework including radiating spokes 34 supported by vertical standards 36. The standards 36 are interconnected near their lower end by a series of chord members 38 and radiating spokes 40.

Figure 2:
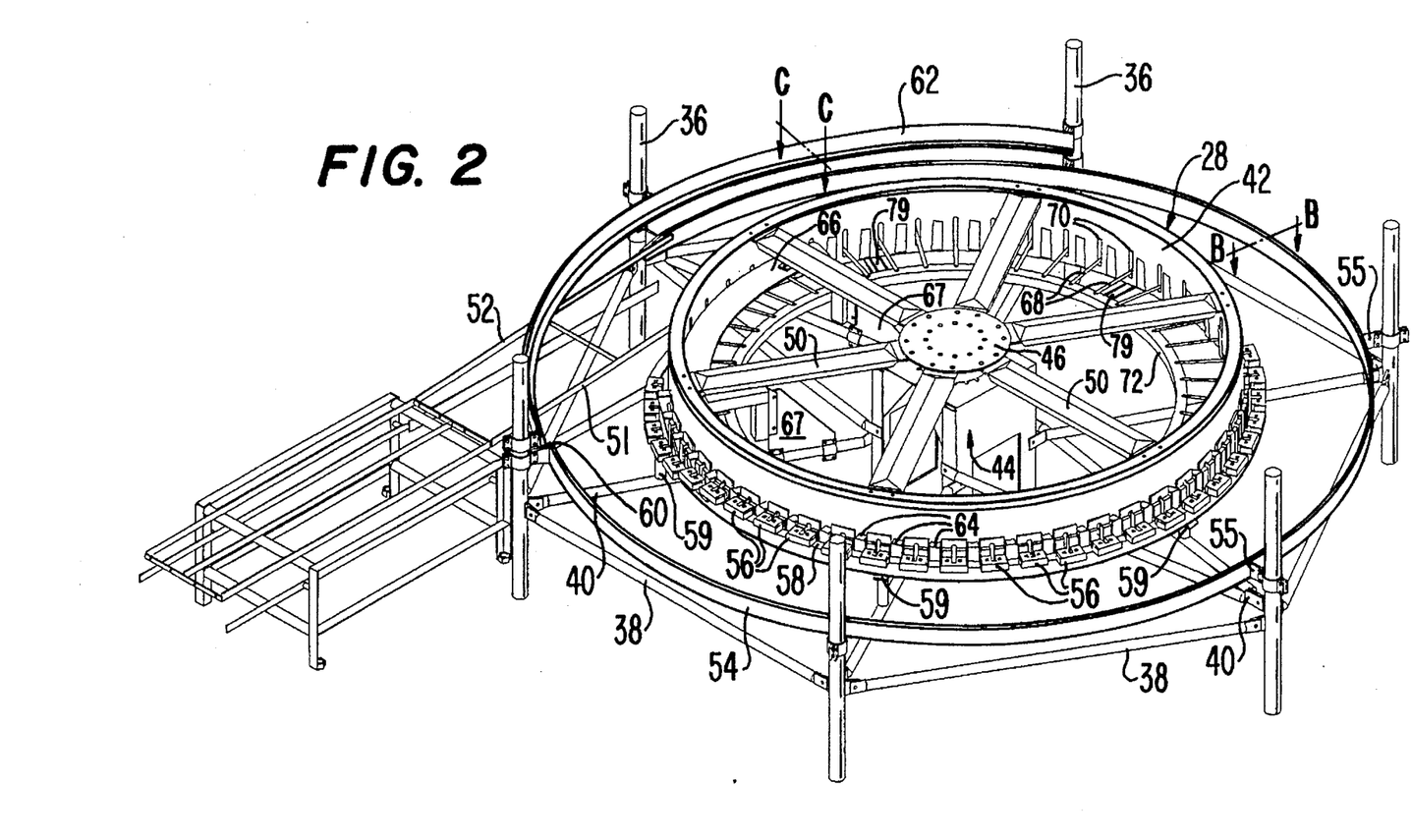
FIG. 2 is a perspective view of a belt supporting framework and structure used in the conveyor of FIG. 1.
Figure 2A:
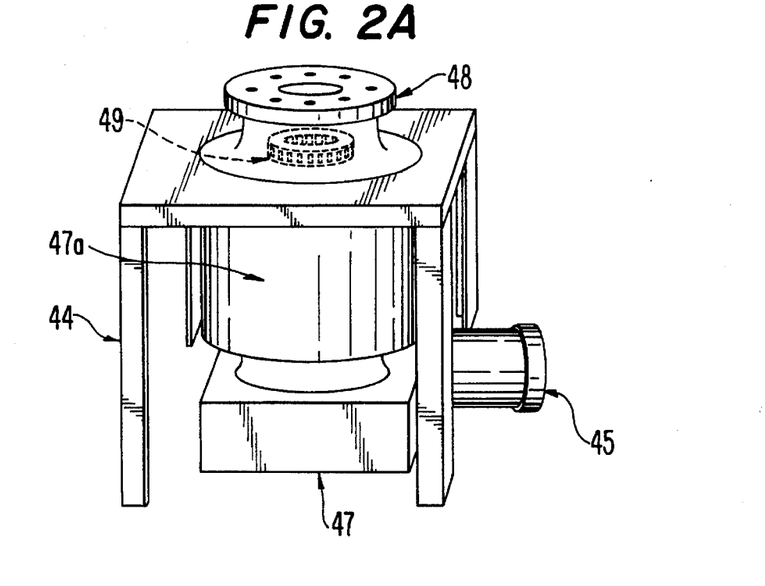
FIG. 2A is a largely schematic perspective view of drum drive components shown only generally in FIG. 2.

In FIG. 2, the bottom portion of the belt supporting structure is shown in more detail with the belt 12 removed. The drum 28 is shown to include a cylindrical base 42 supported centrally on a pedestal 44. At its bottom center, the drum 28 includes a drive hub 46 concentric with the axis 30 and connected by torque transmitting spokes 50 to the base 42. In FIG. 2A, components associated with the pedestal 44 are shown generally to include a drum drive motor 45, a first stage reduction gear box 47, a second stage reduction gear box 47a and a rotatable output flange 48 positioned on the top of the pedestal 44. The output flange 48 is bolted or otherwise fixed to the drive hub 46 of the drum base 42. Also, the output flange 48 is journalled in the pedestal 44 by bearings which include a thrust bearing 49 capable of carrying the weight of the drum 28. Thus, the drum 28 may be driven in rotation about the axis 30 by power supplied from a drive motor 45 to the drive hub 46.

As will be appreciated from the description to follow, the driving torque transmitted to the drum 28, by itself, is used to advance the belt through the several flight portions shown in FIG. 1. The motors 19a and 23a function only to control the condition of the belt as it passes to and from the helical flight portion 20, respectively. Thus, the motor 19a assures that the entrance flight is under the appropriate tension, whereas the motor 23a assures that the exit flight 22 is properly tensioned. Variations in belt length between the driven rollers 19 and 23 are accommodated by the tension roller 25.

From FIG. 1, it will be noted that the entrance flight portion 18 of the conveyor belt 12 advances tangentially to the helical flight portion 20 and becomes the bottom convolution or tier in the helical stack of such tiers. In accordance with the invention, all tiers above the bottom tier are carried only by support of an adjacent lower tier. Thus the helical pitch of all tiers in the helical flight portion 20 is determined by the pitch of the bottom tier and the bottom tier must be supported at a rate of inclination to establish that pitch.

In the illustrated embodiment and as shown in FIG. 2, the entrance flight of the belt 12 is supported under the side edges 15 and 16 by parallel linear rails 51 and 52, respectively to a point of tangency with the drum 28. At that point of tangency, support of the belt edge 16, the outer edge in the helical flight portion 20, is transferred to a helical rail 54 fixed to the posts 36 of the supporting framework by brackets 55. At the same point of tangency, support for the belt edge 15, the inner edge of the helical flight portion 20, is transferred to the first of a series of supporting blocks 56 which project radially from the outer peripheral surface of the base 42 of the drum 28. Although the structure of the supporting blocks 56 and related components will be described in more detail below, it may be observed in FIG. 2 that the supporting blocks slide on a fixed helical guide rail 58 spaced slightly outward from but concentric with the drum 28. The guide rail 58 is mounted on the supporting framework by standards 59 upstanding from the radiating members 40.

At approximately 300° of travel by the belt 12 from the point of tangency between the entrance flight 18 and the drum 28, the rail 54, supporting the outer edge 16 of the belt, terminates at an end 60. Continued support for the outer edge 16 of the belt is supplied at the same pitch by an L-shaped rail 62, spaced outwardly at a greater radius from the axis 30 than the rail of 54, and extending for approximately 120° past the end 60 of the rail 54.

Coincident with termination of the rail 54 at the end 60, support of the inner edge 15 of the belt is transferred from the supporting blocks 56 to members called "flippers" and which are designated in the drawings by the reference numeral 64. The flippers 64 are carried by the drum base 42 between the supporting blocks 56 and are pivotal from a retracted inactive position, flush with the outer surface of the drum base 42, to an outwardly extended belt supporting position as the drum 28 reaches the approximate 300° of revolution from the point of tangency with the entrance flight 18. In the illustrated embodiment, movement of the flippers 64 to their outward active supporting position is effected by a fixed cam segment 66 on the inside of the drum base 42. In particular, the cam segment 66 is mounted on the supporting framework, to be fixed relative to the rotatable drum base 42, by cantilever brackets 67 clamped to the radiating members 40 and secured to opposite ends of the cam segment.

Although the scale of FIG. 2 does not permit a complete illustration of the supporting blocks 56 and the flippers 64, it may be observed in this drawing figure that each of the supporting blocks 56 is connected to a rod 68 which extends radially inward through a vertical slot 70 in the drum base 42 to a ring 72 fixed to and rotatable with the drum base 42 via cantilevered struts 79 extending between the ring 72 and the drum base 42. The assembly of each supporting block 56 and flipper 64 is shown more clearly in FIG. 3. As thus shown, the supporting block is generally shaped as a rectangular parallelepiped to provide an elongated top surface 56a, a similarly elongated and flat bottom surface 56b, front and back surfaces 56c and 56d and identical end faces 56e which join with the top surface 56a through a chamfer 56f. A vertical slot 56g opens at the back surface 56d and extends between the top and bottom surfaces 56a and 56b. Also, a pair of male detent formations 56h project from the top surface 56 on opposite sides of the slot 56g.

Figure 3:
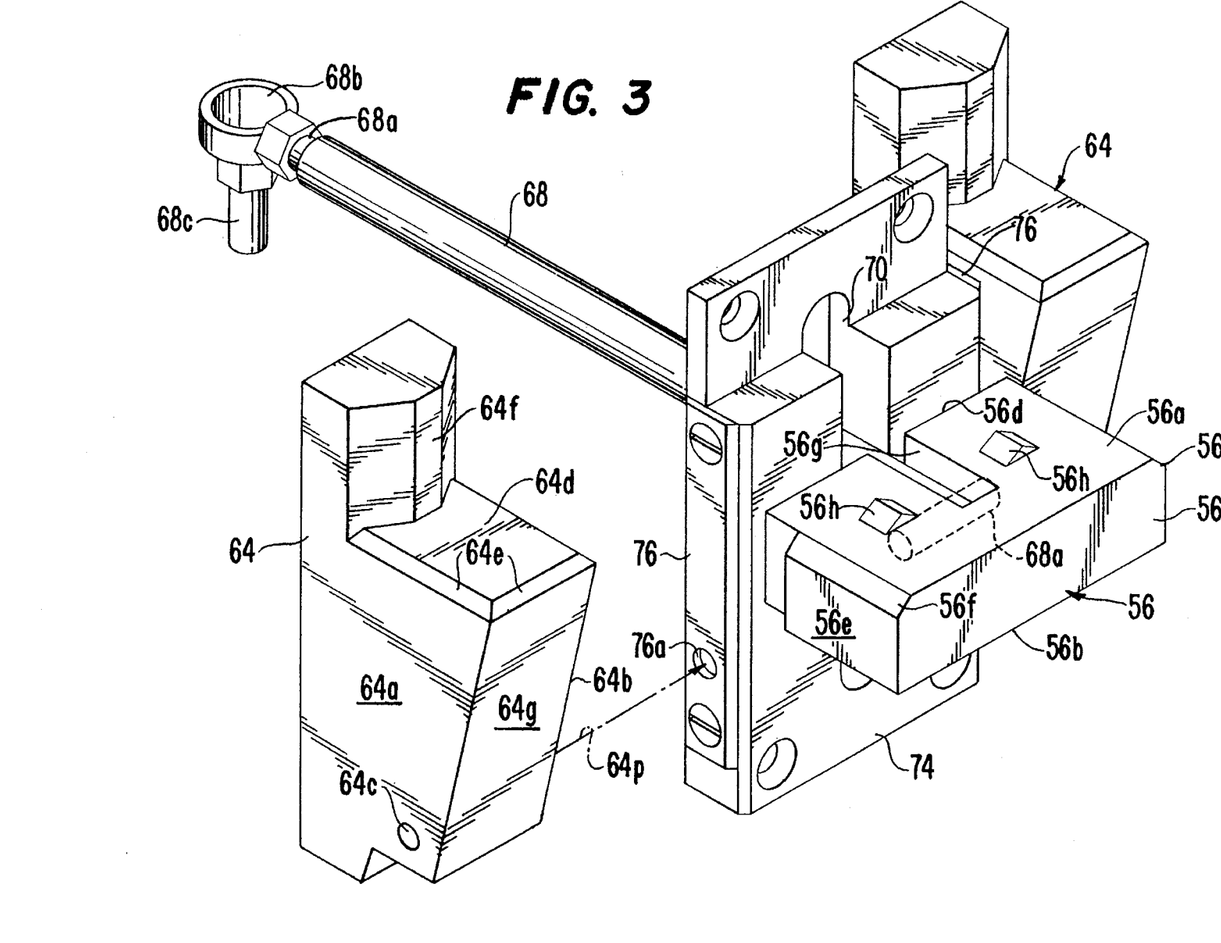
FIG. 3 is an enlarged perspective view of belt supporting components shown in FIG. 2.

The outer end of the rod 68 extends into the slot 56g and is secured by a pivot pin 68a shown in phantom lines. As a result of this connection to the rod 68, it will be appreciated that the supporting block 56 is free to pivot on the axis of the pivot pin 68a. The inner end of the rod 68 is secured by a swivel 68b to a link pin 68c which threads into an internally threaded aperture (not shown) for pivotal connection with the drum mounted interior ring 72 (FIG. 2). Because of the swivel 68b, it will be understood that in addition to free pivotal movement about the pin 68a at the outer end of the rod 68, the supporting block 56 is free to rotate on the axis of the rod 68. Thus, the block 58 is universally pivoted with respect to the rod 68.

The vertical slot 70 through which the rod 68 extends inwardly of the supporting block 56 is formed in a rod guide plate 74 adapted to be secured against the outer peripheral surface of the drum base 42 by screws, bolts or other equivalent fastening devices. In addition to providing the vertical slot 70 by which the torque of drum rotation is transmitted to the supporting blocks 56, the guide plates 74 are spaced by the width of the flippers 64 and establish the vertical sides of openings in the drum base 42 in which the flippers 64 are mounted. To this end, a flipper bearing plate 76, preferably of stainless steel, is mounted along each of opposite sides of each guide plate 74.

The flippers 64, as shown in FIG. 3, are also each formed preferably as a monolithic block having parallel and planar vertical side surfaces 64a and 64b. Each flipper is pivoted between two guide blocks 74 on an axis 64p by a pin (not shown) extending through a bore 64c at the lower front portion of the flipper 64 into apertures 76a in the bearing plate 76. A belt support ledge 64d, having chamfered edges 64e, extends from a back stop portion 64f to a front surface 64g of each flipper. Although not shown clearly in the drawings, the back stop portion 64f of each flipper is positioned inside the peripheral wall of the drum base 42 and functions to limit outward pivotal movement of the respective flippers 64 from the retracted inactive position described above to the extended belt supporting position.

Figure 2B:
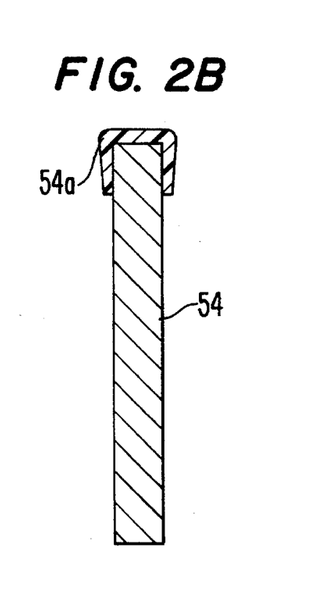
FIG. 2B is a cross-section on line B—B of FIG. 2.
Figure 2C:
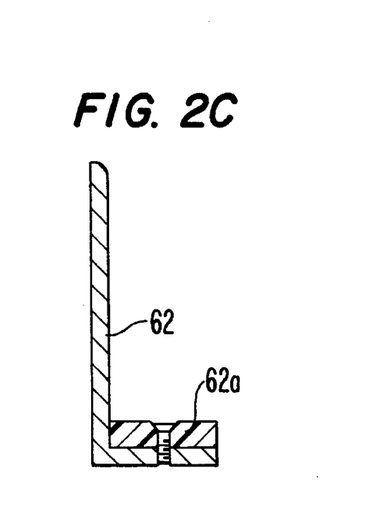
FIG. 2C is a cross-section on line C—C of FIG. 2.

It is to be noted that the helical conveyor 10 is to be used for freezing food products, for example, the supporting block 56, the flipper 64 and the rod guide block 74 are formed of ultra high molecular weight polyethylene or equivalent material which exhibits a combination of low friction, strength and resistance to accumulation of foreign material including frost and ice. Thus, the supporting block 56 exhibits a low frictional drag on the inclined rail 58, preferably formed of stainless steel, and described above with reference to FIG. 2. Also, the rod 68, being formed of stainless steel or equivalent, exhibits very little frictional drag in sliding up and down in the slot 70 of the guide block 74. As shown in FIG. 2B, the rail 54, though formed of steel for strength, is provided with a top portion 54a of ultra high molecular weight polyethylene or equivalent material to minimize frictional drag in directly supporting the outer edge of the conveyor belt. Similarly, and as shown in FIG. 2C, the loadbearing surface of the rail 62 is lined with a strip 62a of low friction material of the type described. Thus, friction between all relatively moving parts of the conveyor 12 and its supporting components is kept at a minimum.

Although ultra high molecular weight polyethylene is a preferred material for application of the helical conveyor of the invention to freezing environments, it is contemplated other high strength, low friction materials may be substituted. For example, for relatively high temperature food cooking applications, low friction materials more resistive to heat will be used.

In accordance with the present invention, the conveyor belt includes a plurality of successive sections interconnected for pivotal and translational movement relative to each other. Each of the belt sections includes at least one rod extending between the opposite side edge portions of the belt, a pair of spaced upstanding supports, each having a top detent formation and secured to the rod at the opposite side edge portions of the belt. A bottom detent formation is provided under each of said upstanding supports.

Figures 4, 5:
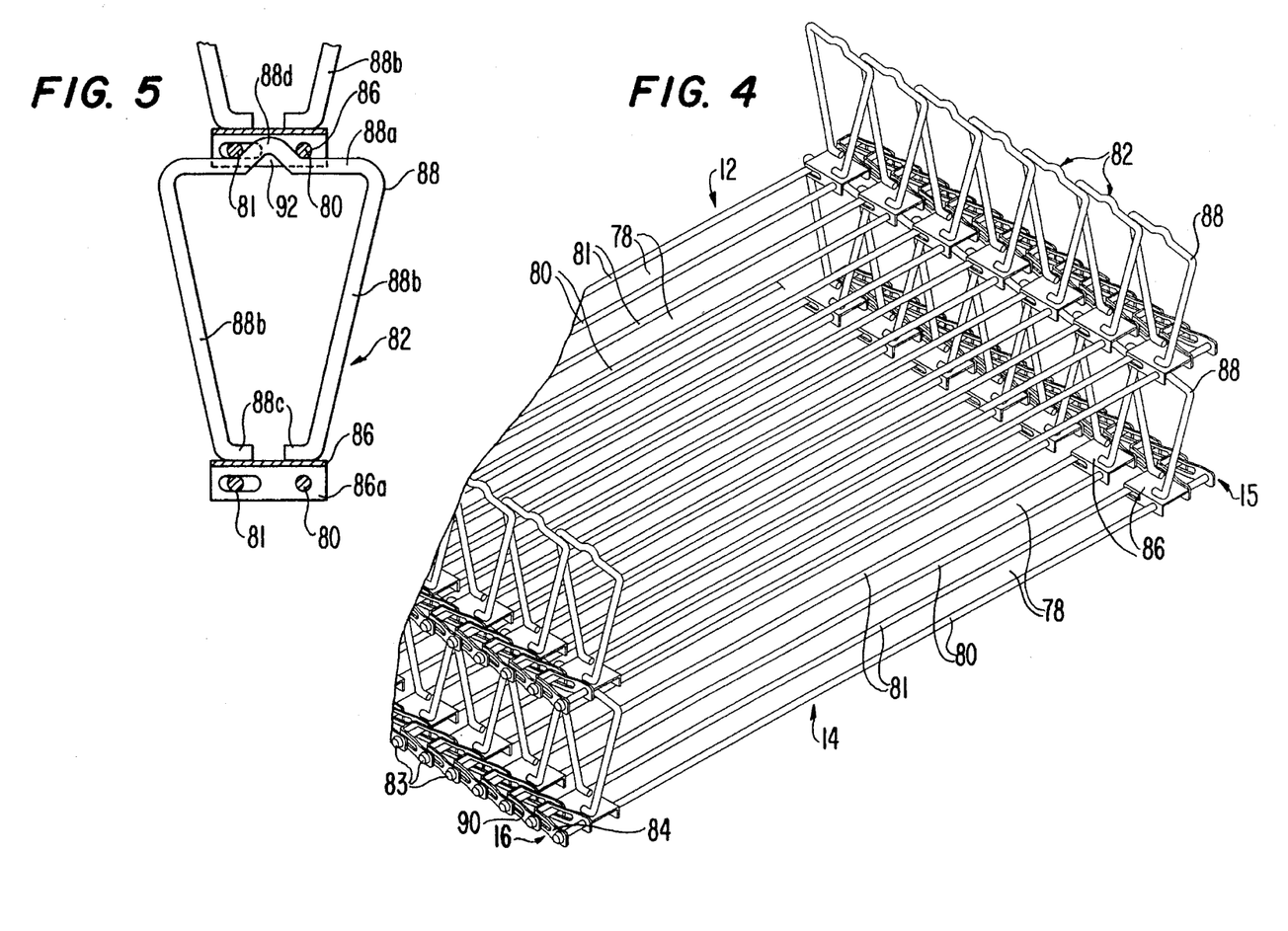
FIG. 4 is a fragmentary perspective view illustrating superimposed conveyor belt tiers.
FIG. 5 is an enlarged fragmentary cross-section showing components of a conveyor belt section.

In FIG. 4, the conveyor belt 12 of the illustrated embodiment is shown most clearly in two tiers where the top tier is carried by the bottom tier. To facilitate a description of the conveyor belt structure, the terms "conveyor section" and "connecting link" will be used respectively to identify a unit section of the conveyor belt and a component used to interconnect adjacent conveyor sections. Thus, in FIG. 4, an individual conveyor section is designated by the reference number 78 and preferably includes a pair of spaced transverse rods 80 and 81 extending for the full width of the belt 12 between end caps 83 at the extreme opposite side edges 15 and 16.

Each of the conveyor sections 78 additionally includes a pair of upstanding supports 82 near the opposite side edges 15 and 16 and a pair of connector links 84 at the opposite side edges. In the illustrated embodiment, the upstanding supports 82 each include a base plate 86 having depending side walls 86a and a bent rod loop 88. Each loop 88 is of generally inverted U-shaped configuration to establish a top, generally horizontal, cross-member 88a, a pair of downwardly converging leg portions 88b and a pair of foot portions 88c at the bottom ends of the leg portions. The foot portions 88c are secured to the top of the plate 86 such as by welding, for example. The foot portions are displaced laterally for support strength and also to orient the cross-members 88a at an angle to the longitudinal direction of the belt in a manner to permit the supports 82 of adjacent conveyor sections 78 to overlap.

One of the two rods in each conveyor section 78, the rod 80 in the illustrated embodiment, extends through and is secured within circular apertures in the depending side walls 86a of the associated base plate 86 and in the open ends of the connecting link 84. The rod 80 of each conveyor section is secured to the base plates 86 by welding the end cap 83 at each end of the rod to the link 84, and welding the inside of the link 84 to the base plate 86. The other rod 81 extends through elongated slots 86b in the side walls of the base plate 86 and slots 84a in the closed end of the connecting link 84. In addition, the rod 81 engages in circular openings at the open end of an intermediate connector link 90, identical to the link 84, but which functions to connect adjacent conveyor sections 78 to each other.

To enable stacking of the helical tiers of the conveyor belt 12 without longitudinal slipping between the tiers, a top detent formation is provided in each upstanding support 82. As shown most clearly in FIG. 5, the top detent formation is provided by a bent projection 88*d* in the top cross-member 88*a* of each bent rod loop 88. A bottom detent formation is provided for each support, in the illustrated embodiment, by a space 92 delimited by the two rods 80 and 81 in each conveyor section 78 and by the depending side walls 86*a* on each base plate 86. As a result of the top and bottom detent formations, the position of each conveyor section 78 may be controlled so that in successive helical tiers of the conveyor belt 12, each conveyor section is aligned vertically with a corresponding supporting section in an underlying tier.

In operation of the helical conveyor 10 with the conveyor belt 12 trained through the several flight portions illustrated in FIG. 1, the drum 28 is driven continuously in a rotational direction to feed the entrance flight portion 18 toward the drum 28 and the helical flight portion 20. Correspondingly, the exit flight portion 22 is advanced from the drum 28 and helical flight portion 20. Although not illustrated in the drawings, auxiliary drive motors are associated with both the entrance and exit flight portions 18 and 22 of the belt 12 to control the travel of these portions of the belt in synchronism with revolution of the drum 28.

As the entrance flight portion 18 reaches a point of tangency with the drum 28, the conveyor belt undergoes a lateral bending to the outside circular configuration of the drum 28. This bending results in relative translational movement of the conveyor sections 78 at the side edges 15 and 16 of the belts. In particular, the conveyor sections translate toward each other at the inner edge 15, or away from each other at the outer edge 16 of the belt 12, or a combination of both such translational movements.

Also at the point of tangency between the entrance flight portion 18 and the drum 28, support of the belt is transferred to the ramp 54 under the upstanding supports 88 near the outer edge 16 of the belt and to the supporting blocks 56 under the upstanding supports 88 near the inner belt edge 15. The vertical travel of the supporting blocks 56 and of the ramp 54 during one complete revolution of the drum 58 is represented schematically in FIGS. 6 and 7 of the drawings, respectively.

Figure 6:
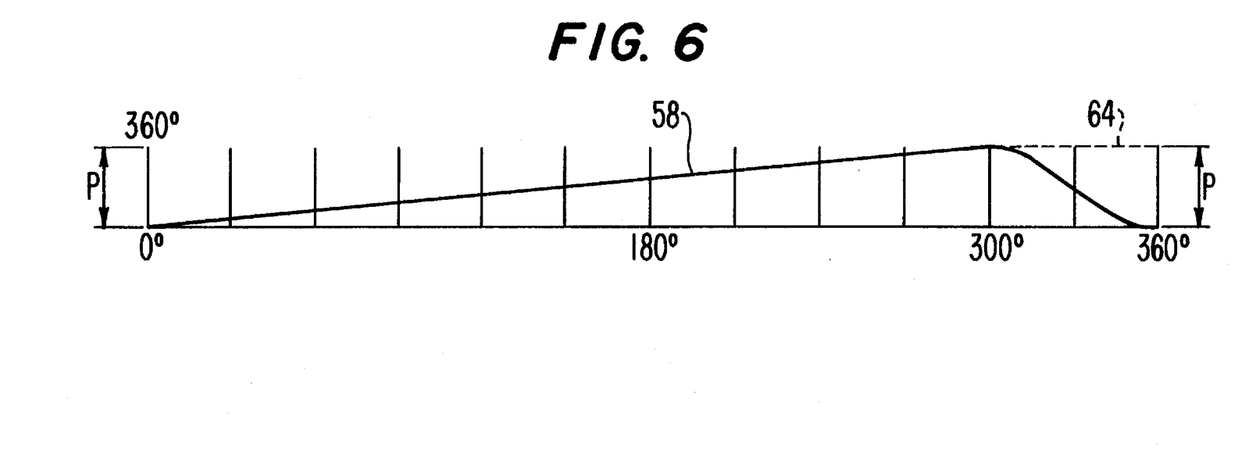
FIG. 6 is a schematic view depicting the path in which the inboard edge of the conveyor belt is lifted.

In FIG. 6, at 0°, the point of tangency between the entrance flight 18 and drum 28, the supporting blocks 56 are at a lowermost elevation and at that elevation, engage the underside of the belt at its inner edge 15. In particular, the detent formations 56*h* (FIG. 3) on the top surface of each supporting block 56 engage the bottom detent formations 92 of two of several (e.g., six) conveyor sections 78. In this manner, the spacing between the inner ends of the conveyor sections 78 is established. Also, drum torque advancing the supporting blocks 56, is transmitted to the belt 12 by engagement of the detents 56*h* with the spaced conveyor sections.

During rotation of the drum 28 through approximately 300°, the supporting blocks 56 elevate on the rail 58 represented by line in FIG. 6. Also, the flippers 64 are in their retracted position during this angle of drum rotation. At approximately 300°, the supporting blocks reach an elevation corresponding to one pitch P of the helical flight portions 22, or the elevation of one helical tier of the belt 12. Also at 300° of drum rotation, the flippers engage the leading end of the fixed cam segment 66, causing them to move out to their extended position so that support for the inner edge of the belt is transferred from the supporting blocks 56 to the flippers 64. The flippers 64 support the inner edge of the belt at constant elevation from 300° to 360° of drum rotation as represented by the line 64 in FIG. 6. At 360° of drum rotation, support for the inner edge of the belt is transferred from the flippers 64 to a previously wrapped belt tier and the flippers 64 are moved back to their retracted positions by the inner edge 15 of the belt 12. As explained above with reference to FIG. 5, each section 78 of the belt engages a section in the underlying tier by engagement of the bottom detent formation 92 with the top detent formation 88.

While the inner edge of the belt is supported by the flippers (from 300° to 360° of drum rotation), the supporting blocks 56 travel on the ramp 58 downwardly to their initial position at an elevation to again engage the belt in transition between the entrance flight portion 12 and the helical flight portion 20.

Figure 7:
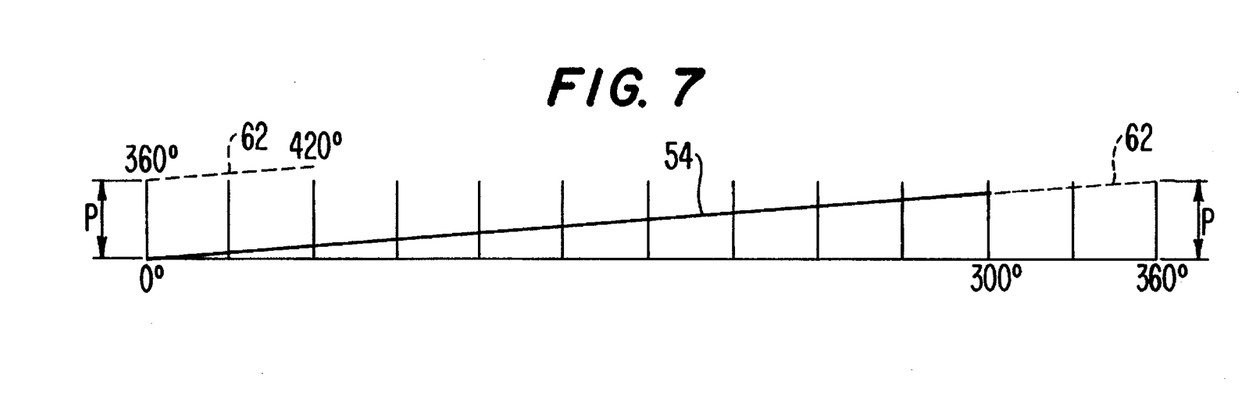
FIG. 7 is a similar view illustrating the path of the outboard edge of the conveyor belt.

As may be understood from FIGS. 2 and FIG. 7, the outer edge 16 of the belt is supported by the rail 54 at a constant rate of elevation from 300° of drum rotation. At 300°, support for the outer edge is transferred to the L-shaped rail 62. Because the rail 62 is displaced outwardly of the rail 54, support by the rail 62 is outside of the upstanding supports 88. In particular, the rail 62 underlies the connecting links 84 and 90 whereas the rail 54 and support between successive belt tier above the bottom tier underlies the supports 82 which are spaced inwardly of the connecting links. As such, the rail 62 may continue through approximately 60° after the belt is supported by an underlying tier. In this way, the transition of belt support to an underlying tier is stabilized.

As the conveyor belt 12 travels up through the helical flight portion 20, the inner edge 15 of the belt is spaced slightly from the outer peripheral surface of the drum 28 because of the projection of the supporting blocks 56 from the drum outer surface and the support of each belt tier on an underlying tier, successively to the bottom tier supported on and positioned by the supporting blocks 56. As shown in FIG. 1, the outside periphery of the drum is provided with spaced vertical bars 94 of ultra high molecular weight polyethylene or equivalent material. The bars stabilize the stacked helical tiers and also provide for circulation of air or cleaning fluids about the inside edge of the conveyor belt 12 in the flight portion 20.

From the foregoing description, several advantages of the helical conveyor belt of the present invention will be appreciated. For example, the attainment of a completely self-stacking helical flight portion using the open loops of the supports 82 not only avoids the need for auxiliary tier supporting structure, but also facilitates both belt cleaning and circulation of air about products carried on the conveyor belt 12. The support of the outer edge of the bottom tier of the conveyor belt by the continuous rails 54 and 62 without interference of tier stacking ensures stability particularly as the bottom tier forms and begins to support the next higher tier in the helical stack. Also, the simplified construction of the supporting blocks 56 and associated components not only eliminates wheel and related hardware used in prior art devices, but minimizes jamming or sticking under the environment of a freezer in which a combination of frost, ice and food debris often clog mechanisms associated with helical conveyors. Other advantages of the present invention will be apparent from the practice of the invention as defined by the appended claims.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A self stacking helical conveyor comprising:

a drum supported for rotation on a vertical axis;

an endless belt trained about the drum in vertically successive helical tiers, beginning with a bottom tier, and having a width spanning a central load bearing portion and opposite side edge portions, the belt including a plurality of successive conveyor sections interconnected for pivotal and translational movement relative to each other, each of said conveyor sections including a pair of spaced upstanding supports secured to each conveyor section at opposite side edge portions of the belt, each of said upstanding support having a top detent formation vertically aligned with a bottom detent formation; and a supporting assembly associated with the drum to support the bottom tier, the others of the helical tiers being supported by engagement of the bottom detent formations with the top detent formations on the spaced upstanding supports in an adjacent underlying tier of the belt, said top and bottom detent formations engaging each other to restrict relative tangential movement of vertically aligned conveyor sections in adjacent tiers.

2. The helical conveyor recited in claim 1 wherein said supporting assembly comprises inner and outer inclined fixed rails concentric with the vertical axis and spaced outwardly of the drum to support the respective inner and outer side edge portions of the endless belt.

3. A self stacking helical conveyor comprising:

a drum supported for rotation on a vertical axis;

an endless belt trained about the drum in vertically successive helical tiers, beginning with a bottom tier, and having a width spanning a central load bearing portion and opposite side edge portions, the belt including a plurality of successive conveyor sections interconnected for pivotal and translational movement relative to each other, each of said conveyor sections including a pair of spaced upstanding supports secured to each conveyor section at opposite side edge portions of the belt, each of said upstanding supports having a top detent formation vertically aligned with a bottom detent formation; and a supporting assembly associated with the drum to support the bottom tier, the others of the helical tiers being supported by engagement of the bottom detent formations with the top detent formations on the spaced upstanding supports in an adjacent underlying tier of the belt;

each of said upstanding supports comprising a bent rod loop of generally inverted U-shaped configuration to establish in each support a top member and a pair of depending leg members.

4. The helical conveyor recited in claim 3 wherein the legs of the loop converge downwardly.

5. The helical conveyor recited in claim 3 wherein said top detent formation comprises a bend in the top run of the support.

6. The helical conveyor recited in claim 5 wherein each of said conveyor sections comprises a pair of spaced rods extending between the opposite side edge portions of the endless belt, each of the upstanding supports including a base plate overlying and connecting the pairs of spaced rods, said bottom detent formation being formed by portions of the pair of rods underlying said base plate.

7. The helical conveyor recited in claim 3 wherein the top member of the loop is inclined with respect to the direction of belt travel.

8. A self stacking helical conveyor comprising:

a drum supported for rotation on a vertical axis;

a plurality of supporting blocks supported by the drum for relative vertical movement;

an endless belt trained about the drum in vertically successive helical tiers, beginning with a bottom tier, and having a width spanning a central load bearing portion and opposite side edge portions, the belt including a plurality of successive conveyor sections interconnected for pivotal and translational movement relative to each other, each of said conveyor sections including a pair of spaced upstanding supports secured to each conveyor section at opposite side edge portions of the belt, each of said upstanding supports having a top detent formation vertically aligned with a bottom detent formation; and a supporting assembly associated with the drum to support the bottom tier, the others of the helical tiers being supported by engagement of the bottom detent formations with the top detent formations on the spaced upstanding supports in an adjacent underlying tier of the belt;

said supporting assembly comprising inner and outer inclined fixed rails concentric with the vertical axis and spaced outwardly of the drum to support the respective inner and outer side edge portions of the endless belt;

said supporting blocks projecting from the drum to overlie the inner rail and to underlie the inner side edge portion of the endless belt.

9. The helical conveyor recited in claim 8 wherein each of said supporting blocks is connected to the drum by a rod having an inner end pivotally connected inside of the drum, the rod extending outwardly through a vertically oriented slot in the drum and connected at an outer end to the supporting block.

10. The helical conveyor recited in claim 9 comprising means connecting the supporting block for universal pivotal movement to the outer end of the rod.

11. The helical conveyor recited in claim 8 wherein the inner rail is inclined in one direction to change the elevation of the supporting blocks and the inner side edge portion of the conveyor by the pitch of one tier over a major portion of a drum revolution and inclined in the opposite direction for a minor portion of the drum revolution to position the supporting blocks for engagement with a successive bottom tier of the endless belt.

12. The helical conveyor recited in claim 11 wherein the major and minor portions of one drum revolution are 300° and 60°, respectively.

13. The helical conveyor recited in claim 11 comprising a plurality of flippers supported by the drum between the supporting blocks for movement between a retracted inactive position and an extended position to support the inner side edge portion of the belt during said minor portion of drum revolution.

14. The helical conveyor recited in claim 12 including a fixed camming member on the inside of the drum for moving said flippers from the retracted position to the extended position.

15. The helical conveyor recited in claim 8 wherein said supporting blocks each comprise a monolithic block of low friction material.

16. The helical conveyor recited in claim 15 wherein the low friction material is ultra high molecular weight polyethylene.

17. The helical conveyor recited in claim 8 wherein each of said supporting blocks includes a top surface having at least one detent formation formed thereon to complement the bottom detent formation of at least one of said upstanding supports.

18. The helical conveyor recited in claim 17 wherein the top surface of each supporting block supports a plurality of the conveyor sections and includes a pair of said detent formations to complement the bottom detent formations at the inside edge portion of two spaced conveyor sections of said plurality of conveyor sections.

19. The helical conveyor recited in claim 2 wherein said outer rail is inclined at a constant rate and extends through at least one complete revolution of said drum.

20. A self stacking helical conveyor comprising:

a drum supported for rotation on a vertical axis;

an endless belt trained about the drum in vertically successive helical tiers, beginning with a bottom tier, and having a width spanning a central load bearing portion and opposite side edge portions, the belt including a plurality of successive conveyor sections interconnected for pivotal and translational movement relative to each other, each of said conveyor sections including a pair of spaced upstanding supports secured to each conveyor section at opposite side edge portions of the belt, each of said upstanding supports having a top detent formation vertically aligned with a bottom detent formation; and a supporting assembly associated with the drum to support the bottom tier, the others of the helical tiers being supported by engagement of the bottom detent formations with the top detent formations on the spaced upstanding supports in an adjacent underlying tier of the belt;

said supporting assembly comprising inner and outer inclined fixed rails concentric with the vertical axis and spaced outwardly of the drum to support the respective inner and outer side edge portions of the endless belt, said outer rail being inclined at a constant rate and extending through at least one complete revolution of said drum;

said outer rail comprising first and second rail sections, said first rail section underlying the upstanding supports and extending for a major portion of one drum revolution, said second rail section being displaced outwardly from said first rail section to underlie the outer side edge portion outside of said upstanding supports.

21. The helical conveyor recited in claim 20 wherein the second rail section is of L-shaped cross sectional configuration.

22. The helical conveyor recited in claim 20 wherein said first rail section extends through 300° of drum rotation and wherein said second rail section extends through 120° of drum rotation.

* * * * *